United States Patent
Yashiki et al.

(10) Patent No.: US 6,334,913 B1
(45) Date of Patent: Jan. 1, 2002

(54) CORROSION-RESISTANT TITANIUM ALLOY

(75) Inventors: Takashi Yashiki, Osaka; Hideto Ohyama, Takasago, both of (JP)

(73) Assignee: Kobe Steel, Ltd., Kobe (JP)

(*) Notice: Subject to any disclaimer, the term of this patent is extended or adjusted under 35 U.S.C. 154(b) by 0 days.

(21) Appl. No.: 09/472,207

(22) Filed: Dec. 27, 1999

(30) Foreign Application Priority Data

Dec. 28, 1998 (JP) .............................. 10-373467

(51) Int. Cl.$^7$ .............................................. C22C 14/00
(52) U.S. Cl. ........................ 148/421; 148/669; 420/417
(58) Field of Search ........................ 420/417; 148/421, 148/669

(56) References Cited

U.S. PATENT DOCUMENTS

| | | | |
|---|---|---|---|
| 3,063,835 A | | 11/1962 | Stern |
| 4,139,373 A | | 2/1979 | Notton |
| 4,253,933 A | * | 3/1981 | Sato et al. |
| 4,666,666 A | * | 5/1987 | Taki et al. |
| 4,859,415 A | * | 8/1989 | Shida et al. ............. 420/417 |
| 5,091,148 A | | 2/1992 | Prasad |
| 5,316,722 A | * | 5/1994 | Sugizaki et al. |
| 5,437,835 A | | 8/1995 | Sugizaki et al. |
| 5,478,524 A | * | 12/1995 | Nakanose et al. |

FOREIGN PATENT DOCUMENTS

| | | | | |
|---|---|---|---|---|
| DE | 32 09 470 C2 | | 9/1982 | |
| JP | 53-037513 A | * | 4/1978 | ........... C22C/14/00 |
| JP | 53-123322 | | 10/1978 | |
| JP | 61-009543 A | * | 1/1986 | ........... C22C/14/00 |
| JP | 62-107040 | | 5/1987 | |
| JP | 62107040 A | * | 5/1987 | |
| JP | 62107041 A | * | 5/1987 | |
| JP | 62-107041 | | 5/1987 | |
| JP | 62-199744 | | 9/1987 | |
| JP | 62199744 A | * | 9/1987 | |
| JP | 62-56219 | | 11/1987 | |
| JP | 63-12932 | | 3/1988 | |
| JP | 63118034 A | * | 5/1988 | |
| JP | 4-57735 | | 9/1992 | |
| JP | 5-77733 | | 10/1993 | |
| JP | 6-25778 | | 2/1994 | |

* cited by examiner

*Primary Examiner*—Roy King
*Assistant Examiner*—Harry D. Wilkins, III
(74) *Attorney, Agent, or Firm*—Oblon, Spivak, McClelland, Maier & Neustadt, P.C.

(57) ABSTRACT

A corrosion-resistant Ti alloy includes Pd in an amount of 0.020–0.050 mass %, and includes one or more platinum group elements other than Pd in an amount of one-third or more of the mass of Pd, with the balance being composed of allowable components and Ti. This alloy exhibits excellent corrosion-resistance. If the Fe content is 0.05% or less and O content is 0.05% or less, excellent cold-workability can be obtained. If the Pd content is 0.030% or less, not only cold-workability and corrosion-resistance but also resistance against hydrogen absorption can be obtained.

13 Claims, 1 Drawing Sheet

CORROSION-RESISTANT TITANIUM ALLOY

BACKGROUND OF THE INVENTION

The present invention relates to a corrosion-resistance Titanium (hereafter abbreviated to Ti) alloy, and a member comprising this corrosion-resistance Ti alloy.

It is generally known that commercially pure Ti is superior to stainless steel and copper alloy in corrosion-resistance. In commercially pure Ti, however, corrosion is caused in non-oxidizing acid having a high temperature and a high concentration. Moreover, crevice corrosion is caused in a chloride solution having a high temperature and a high concentration. As methods for preventing such corrosion, there have been investigated a method of adding an alloying element, a method of adding an oxidizing agent in corrosion environment, a method of subjecting commercially pure Ti to surface treatment, and the like. Above all, the method of adding an alloying element is most reliable. Any platinum group element such as Pd or Ru is effective. This is because the hydrogen generating overvoltage of Pd or Ru is small so as to promote anodic polarization of Ti promptly. That is, the following oxidization reaction advances promptly on the surface of Ti, so that passivity oxidized film $TiO_2$ is generated:

$$Ti+2H_2O \rightarrow TiO_2+4H^++4e^-.$$

Thus, corrosion-resistance is improved. Specifically, Ti alloys such as Ti-0.15Pd alloy (ASTM Grade 7 and 11) have been developed. They are used in the fields of petroleum refining, petroleum chemistry plant and the like. However, the Ti-0.15Pd alloy has a problem that it contains a relatively large amount of expensive Pd so that material costs rise. In the case that the Ti alloy contains a large amount of Pd, Pd oxide, which is commonly called Pd black, is produced on the surface at the time of pickling. Thus, the pickling is blocked, so that the alloy needs to be passed through a pickling line many times. Thus, production costs also become high.

Recently, therefore, a Ti alloy has been developed to which an iron group element is added in such a small amount that does not damage workability in order to suppress addition of Pd or Ru, which leads to an increase in costs, as much as possible and compensate for deterioration in corrosion-resistance based thereon. For example, there are suggested Ti-0.05Pd-0.3Co (ASTM Grade 30 and 31; Japanese Published Examined Patent Application No. 6-89423) and Ti-0.5Ni-0.05Ru alloy (ASTM Grade 13, 14 and 15; Japanese Published Examined Patent Application No. 62-20269). These alloys are alloys wherein the added amount of an expensive platinum group element such as Pd or Ru is restricted to suppress an increase in costs and further deterioration in corrosion-resistance caused by a drop in the added amount of the platinum group element is supplemented by adding an additional element (Ni, Mo, Co or the like) contributing to an improvement in corrosion-resistance so far as workability is not largely damaged. However, it is unavoidable that workability drops by the addition of the corrosion-resistance improving element. Thus, it is difficult to use the above-mentioned Ti alloy for members which corrosion-resistance is required for and are subjected to a relatively strict cold work such as punch forming, for example, a plate type heat exchanger or components for an electrolysis bath in sodium electrolysis. Therefore, in spite of an increase in costs it is unavoidable to use, for purposes for which both corrosion-resistance and cold-workability are required, Ti-0.15Pd alloy (ASTM Grade 11), to which any corrosion-resistance improving element which damages workability, such as Ni, Mo or Co, is not added.

Incidentally, Ti is widely used in a condenser tube in a thermal power station and a nuclear power station, laying pipes in a high temperature and high-pressure chemical plant, such as a urea synthesizing plant, and a heat exchanger tube in a device for converting seawater to plain water. In accordance with uses, Ti may absorb hydrogen so that an accident may arise by hydrogen embrittlement. According to Japanese Published Examined Patent Application No. 4-57735, the Ti-0.15Pd alloy contains a large amount of Pd so that it has insufficient hydrogen adsorption resistance, as compared with commercially pure Ti. Thus, the publication suggests a Ti alloy wherein the amount of Pd is adjusted into the range of 0.03 to 0.1% [for example, Ti-0.05Pd alloy (ASTM Grade 16 and 17)]. In actual use, however, the hydrogen absorption of Ti is complicatedly related to surface states (roughness and finishing methods), grain size and use environment. Therefore, even if the Ti alloy wherein the amount of Pd is controlled to the range of 0.03 to 0.1%, hydrogen absorption is occasionally caused.

SUMMARY OF THE INVENTION

The inventors paid attention to the above-mentioned situations and have made the present invention. Thus, an object of the present invention is to provide a Ti alloy that is lower in price and better in corrosion-resistance than the Ti-0.15Pd alloy, which is widely used. Another object of the present invention is to provide a corrosion-resistance Ti alloy having a cold-workability (press formability) that is not less than that of the Ti-0.15Pd alloy, and a corrosion-resistance Ti alloy excellent in resistance against hydrogen absorption.

The corrosion-resistance Ti alloy according to the present invention, which attains the above-mentioned object, comprises Pd in an amount of 0.020–0.050 mass %, and comprises one or more platinum group elements other than Pd in an amount of one-third or more of the mass of Pd, and the balance being composed of allowable components and Ti.

DETAILED DESCRIPTION OF THE PREFERRED EMBODIMENTS

Figure 1:
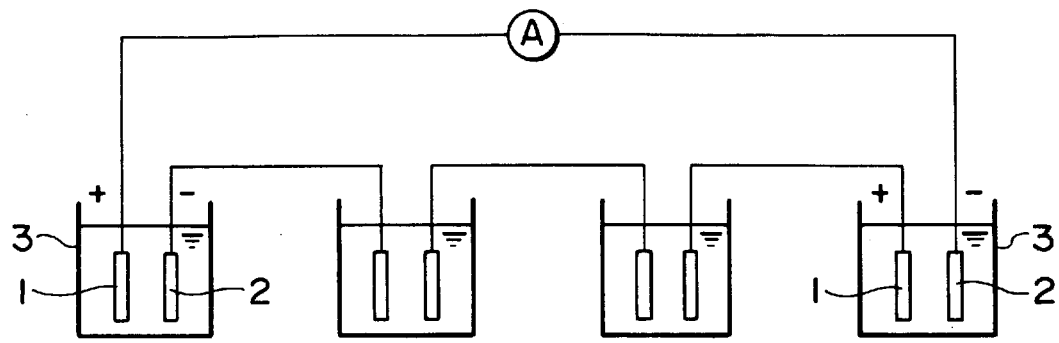
FIG. 1 is a view showing the method of the experiment of the cathodic polarization method performed in Example.

In the corrosion-resistance Ti alloy of the present invention, Pd is caused to be comprised in an amount of 0.020–0.050%, one or more platinum group elements other than Pd are caused to be comprised in an amount of one-third or more of the mass of Pd, and the balance is made up to allowable components and Ti. The platinum group elements other than Pd are preferably Ir and/or Pt. Preferably, the content of the platinum group elements other than Pd is 0.01–0.03%, and the Pd content is 0.030% or less.

In order to obtain a corrosion-resistance Ti alloy excellent in cold-workability, it is preferable that the Pd content, the Ir and/or Pt content, the Fe content, and the O content are set to 0.020–0.050%, 0.01–0.03%, 0.05% or less, and 0.05% or less, respectively, and the balance is made up to allowable components and Ti. Such a corrosion-resistance Ti alloy excellent in cold-workability is suitable for a plate type heat exchanger and components for an electrolysis bath. If the Pd content is set to 0.030% or less in the range defined in the present invention, resistance against hydrogen absorption, as well as cold-workability and corrosion-resistance, can be obtained.

In order to obtain a corrosion-resistance Ti alloy which cold-workability as above is not required for and which is necessary to have an excellent resistance against hydrogen absorption, it is preferable that the Pd content, the content of the platinum group elements other than Pd, the Fe content and the O content are set to 0.020–0.030%, 0.01–0.03%, 0.4% or less and 0.4% or less, respectively, and the balance is made up to allowable components and Ti. Such a corrosion-resistance Ti excellent in resistance against hydrogen absorption is suitable for a tube for a heat exchanger and tubes for other purposes.

The allowable components in the present invention are not only ordinary inevitable impurities but also elements that are allowed to be contained within the scope that a bad affect is not produced on the properties of the corrosion-resistance Ti alloy according to the present invention. They may be contained within allowable ranges of the respective elements. Examples of the inevitable impurities include Fe, O, N, H, C, Ni and Cr. These elements are trace components contained in Ti oxide that is a raw material, or elements originating from a stainless container that is used in the production of a sponge Ti.

When the inventors designed the composition of components of Ti alloy, the added amount of Pd, which has the highest capability of improving corrosion-resistance among the platinum group elements, was set to 0.02–0.05% from the viewpoint of balance with a reduction in costs. The inventors produced various Ti alloys to which various platinum group elements other than Pd were added alone or in combination, and then repeated evaluation of corrosion-resistance and cold-workability of the respective Ti alloys. As a result, the inventors found that corrosion-resistance becomes better in the case that one or more platinum group elements other than Pd are caused to be comprised in an amount of one-third or more of the mass of Pd than in the case that the total amount of the platinum group elements other than Pd is replaced with Pd to add Pd alone. Thus, the present invention has been made. The mechanism of this effect has not been made clear, but would be based on the fact that the platinum group elements other than Pd are chemically bonded to Pd or Ti so that a material having a lower hydrogen overvoltage than that of Pd is produced. It is unclear at present why corrosion-resistance is improved when the ratio (mass ratio) of the other platinum group elements to Pd is one-third or more. It can be however presumed that in this range the above-mentioned material having a low hydrogen overvoltage is effectively produced in a more amount. If the ratio (mass ratio) of the other platinum group elements to Pd is too high, a bad affect is produced on formability and costs are increased. Thus, the ratio is preferably set to 2 or less. The ratio may be 1 or less.

In order to obtain sufficient effect of improving corrosion-resistance in the Ti alloy of the present invention, it is necessary to set the Pd content to 0.020% or more. On the other hand, if the Pd content is too large, costs rise and a Pd oxide is produced on the surface at the time of pickling with nitric-hydrofluoric acid to block the pickling. Thus, it is necessary to set the Pd content to 0.05% or less. In order to improve resistance against hydrogen absorption, it is preferable to set the Pd content to 0.030% or less.

The platinum group elements other than Pd include Ir, Pt, Ru, Re, Rh and Os. In the case that these elements are added to Ti, grains become finer so as to deteriorate cold-workability as the added amount is made larger. The degree thereof is different between the particular elements. In order to keep corrosion-resistance and attain good formability, thus, it is necessary to select an adding element which does not contribute to grain refinement as much as possible, along with adding an element effective for improving corrosion-resistance. The inventors examined ability of grain refinement of the respective platinum group elements added to Ti—Pd alloy. As a result, it has become clear that the ability of grain refinement of Ir is smallest and that of Pt is second smallest. The largest ability of grain refinement is Ru. The ability of grain refinement of Re, Rh and Os is in the middle of Pt and Ru. Re, Os and Rh are expensive elements. Thus, by adding one or two of Ir and Pt to a Ti alloy containing Pd, a Ti alloy excellent in formability and corrosion-resistance can be obtained. Above all, a Ti—Pd alloy to which only Ir is added is especially preferable. If costs are ignored, it is effective that one or more of Re, Rh and Os are added to a Ti—Pd alloy.

Fe and O (oxygen) in the Ti alloy are inevitable elements. If the contents of these elements increase, the microstructure becomes fine so that strength rises. Thus, a remarkably bad effect is produced on formability. Therefore, each of the Fe content and the O content is set preferably to 0.10% or less, and more preferably to 0.05% or less. For use for which formability is not considered, each of the contents may be up to 0.4%.

The corrosion-resistance Ti alloy of the present invention may contain not only the inevitable impurities contained in sponge Ti as a raw material but also other elements, so far as they do not produce a bad affect on the properties of the present Ti alloy. Examples of the allowable components include N, H, C, Ni and Cr. For use for which formability is required, the Ti alloy may contain: N: 0.02% or less; H: 0.01% or less; C: 0.02% or less, Ni: 0.05% or less; and Cr: 0.05% or less. The Ti alloy of the present invention may contain elements other than these elements if the total amount thereof is about 0.1% or less. However, the total amount is different in accordance with the degree of required formability. In the case that the corrosion-resistance Ti alloy of the present invention is used for purposes for which formability is not highly required, the Ti alloy may contain various elements in amounts over the above-mentioned upper limits so far as they do not produce a bad affect on the properties of the Ti alloy.

The following will describe the present invention by way of Examples; however, the present invention is not limited by the Examples. Modifications based on the subject matter of the present invention are included within the scope of the present invention.

EXAMPLE 1

Percentages of respective metal powder components were changed as shown in Table 1, and added to commercially pure Ti plates (0: 0.04% and Fe: 0.03%) of JIS first class (corresponding to ASTM Grade 1) as melting materials. They were melted in a vacuum melting furnace to produce ingots (each 500 g). Thereafter, plates for evaluation were produced in the following steps:

soaking (heating at 1000° C. for 2 hours)→hot-rolling (heating at 850° C., about 20$^t$×40$^w$→about 5$^t$×40$^w$) →annealing (at 850° C. for 30 minutes)→shot blast→pickling (the plate was washed down by a thickness of about 1 mm)→cold-rolling (about 4$^t$×40$^w$→about 1.2$^t$×40$^w$)→dipping in a molten salt bath (at 520° C. for three minutes)→pickling (about 1.2$^t$×40$^w$→about 1.0$^t$×40$^w$).

As a general corrosion test, a dipping test was performed in a boiling 5% hydrochloric acid solution for 24 hours to calculate a corrosion rate. The results are also shown in Table 1.

In Nos. 1–9, platinum group elements other than Pd were contained in an amount of one-third or more of the mass of Pd. Therefore, they had a smaller corrosion rate than Nos. 11 and 13, wherein platinum group elements other than Pd were contained in an amount below one-third of the mass of Pd, and Nos. 14 and 15, wherein only Pd was added. In Nos. 10 and 12, platinum group elements other than Pd were contained in an amount of one-third or more of the mass of Pd, but the Pd content was below 0.020%. Thus, corrosion-resistance thereof was poor.

(0.05M, 30° C.). Using a power source for a constant direct current, an electric current was passed at a current density of 10 mA/cm$^2$ between the two for 6 hours to cause hydrogen generated from the cathode to be absorbed on the test piece. In the present test, plural baths 3 for electrolysis were connected in series since several test pieces were treated at a time, as shown in FIG. 1. In order to make uniform the affect on hydrogen absorption by the surface state of the test pieces, the surfaces of all the test pieces were subjected to wet emery polishing (#400). The amount of hydrogen absorption was calculated from the amount of hydrogen before the test and that of hydrogen after the test. Evaluation was made as follows. The amount of hydrogen after the test was analyzed after the hydrogen-absorbed sample was heated at 400° C. in the atmosphere for 1 hour to diffuse a hydrogen rich layer formed on the surface uniformly into the inside direction of Ti.

TABLE 1

| No. | Pd | Ir | Pt | Os | Rh | Re | O | Fe | A | Corrosion rate (mm/year) |
|---|---|---|---|---|---|---|---|---|---|---|
| 1 | 0.020 | 0.008 | | | | | 0.05 | 0.03 | 0.4 | 1.2 |
| 2 | 0.026 | 0.017 | | | | | 0.04 | 0.03 | 0.7 | 0.4 |
| 3 | 0.050 | 0.020 | | | | | 0.04 | 0.03 | 0.4 | 0.2 |
| 4 | 0.020 | | 0.008 | | | | 0.04 | 0.03 | 0.4 | 1.4 |
| 5 | 0.026 | | 0.017 | | | | 0.04 | 0.03 | 0.7 | 0.7 |
| 6 | 0.050 | | 0.020 | | | | 0.04 | 0.03 | 0.4 | 0.25 |
| 7 | 0.026 | | | 0.017 | | | 0.04 | 0.03 | 0.7 | 0.7 |
| 8 | 0.026 | | | | 0.017 | | 0.04 | 0.03 | 0.7 | 0.75 |
| 9 | 0.026 | | | | | 0.017 | 0.04 | 0.03 | 0.7 | 0.7 |
| 10 | 0.015 | 0.017 | | | | | 0.04 | 0.03 | 1.1 | 3 |
| 11 | 0.026 | 0.008 | | | | | 0.04 | 0.03 | 0.3 | 2.8 |
| 12 | 0.015 | | 0.017 | | | | 0.04 | 0.03 | 1.1 | 3.6 |
| 13 | 0.026 | | 0.008 | | | | 0.04 | 0.03 | 0.3 | 3.2 |
| 14 | 0.028 | | | | | | 0.04 | 0.03 | 0.0 | 2.5 |
| 15 | 0.043 | | | | | | 0.04 | 0.03 | 0.0 | 1 |

In this table, A is a mass ratio of the content of platinum group elements other than Pd to the Pd content.

EXAMPLE 2

Percentage of respective metal powder components were changed as shown in Table 2, and added to commercially pure Ti plates (0: 0.04% and Fe: 0.03%) of JIS first class (corresponding to ASTM Grade 1) as melting materials. They were melted in a vacuum melting furnace to produce ingots (each 500 g). Thereafter, plates for evaluation were produced in the following steps:

soaking (heating at 1000° C. for 2 hours)→hot-rolling (heating at 850° C., about 20$^t$×40$^w$→about 5$^t$×40$^w$→annealing (at 850° C. for 30 minutes)→shot blast→pickling (the plate was washed down by a thickness of about 1 mm)→cold-rolling (about 4$^t$×40$^w$→about 0.7$^t$×40$^w$)→dipping in a molten salt bath (at 520° C. for three minutes)→pickling (about 0.7$^t$×40$^w$→about 0.5$^t$×40$^w$).

In order to evaluate corrosion-resistance, a dipping test was performed in a boiling 2% hydrochloric acid solution for 24 hours to calculate a corrosion rate. The evaluation was made as follows. The results are also shown in Table 2.

⊚: corrosion rate=less than 0.1 mm/year

○: corrosion rate=from 0.1 (inclusive) to 0.5 mm/year

Δ: corrosion rate=from 0.5 (inclusive) to 1 mm/year

X: corrosion rate=1 mm/year or more

Figure 2:
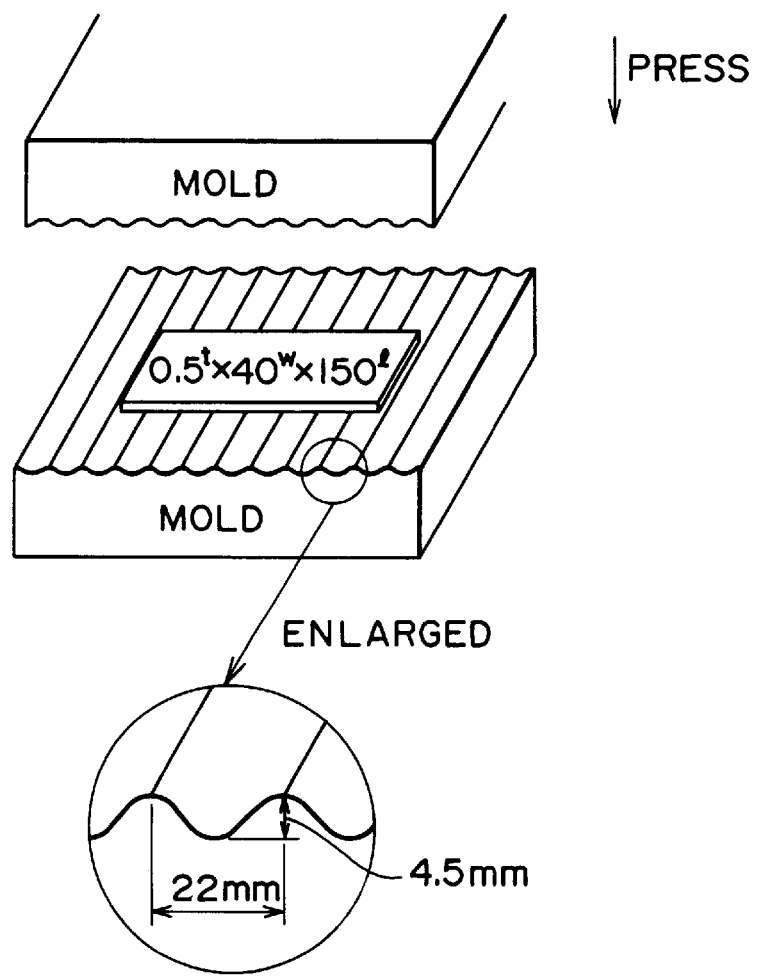
FIG. 2 is a view showing the method of the experiment of press formability.

The cathodic polarization method was used for evaluation of resistance against hydrogen absorption. As shown in FIG. 1, in the present test, a Pt electrode 1 and a rectangular test piece 2 (10 mm×50 mm, thickness: 1 mm) were arranged at an interval of 50 mm in an aqueous solution of sulfuric acid ⊚: hydrogen absorption amount=less than 50 ppm ○: hydrogen absorption amount=from 50 (inclusive) to 100 ppm Δ: hydrogen absorption amount=from 100 (inclusive) to 200 ppm X: hydrogen absorption amount=200 ppm or more In a press formability test, a cut plate having 0.5$^t$×40$^w$×150$^1$ was used and subjected to a press forming into corrugated shape with a mold shown in FIG. 2. The formability was evaluated by results as to whether or not cracks were generated. Using a lubricant for press, the press formability test was performed at room temperature. The results are shown in Table 2.

In Nos. 1–8, which were according to the present invention, corrosion-resistance, resistance against hydrogen absorption and press formability were superior, and no grain refinement was caused.

Nos. 9–11, wherein the O content and the Fe content were large, and Nos. 12–14, wherein the Ir content and/or the Pt content were large, were inferior to Nos. 1–8 in press formability, but were superior in corrosion-resistance and resistance against hydrogen absorption. No. 15, which contained Ru, was inferior to Nos. 1–8 in corrosion-resistance and press formability. Nos. 16 and 17, wherein the Ir content or the Pd content was small, were inferior to Nos. 1–8 in corrosion-resistance. No. 18, wherein the Pd content was large, was inferior to Nos. 1–8 in resistance against hydrogen absorption. Nos. 19–21, which were commercially pure Ti, had insufficient corrosion-resistance.

TABLE 2

| No. | Pd | Ir | Pt | Ru | O | Fe | Corrosion-resistance | Resistance against absorption | Grain size after annealing (μm) | Formability |
|---|---|---|---|---|---|---|---|---|---|---|
| 1 | 0.026 | 0.017 | — | — | 0.04 | 0.03 | ◎ | ○ | 39 | ○ |
| 2 | 0.026 | — | 0.017 | — | 0.04 | 0.03 | ◎ | ○ | 34 | ○ |
| 3 | 0.026 | 0.028 | — | — | 0.04 | 0.03 | ◎ | ○ | 35 | ○ |
| 4 | 0.026 | — | 0.028 | — | 0.04 | 0.03 | ◎ | ○ | 25 | ○ |
| 5 | 0.026 | 0.010 | — | — | 0.04 | 0.03 | ○ | ○ | 40 | ○ |
| 6 | 0.022 | 0.028 | — | — | 0.04 | 0.03 | ○ | ◎ | 33 | ○ |
| 7 | 0.030 | 0.017 | — | — | 0.04 | 0.03 | ◎ | ○ | 38 | ○ |
| 8 | 0.026 | 0.008 | 0.008 | — | 0.04 | 0.03 | ◎ | ○ | 31 | ○ |
| 9 | 0.026 | 0.017 | — | — | 0.06 | 0.06 | ◎ | ○ | 20 | x |
| 10 | 0.026 | 0.017 | — | — | 0.09 | 0.06 | ◎ | ○ | 18 | x |
| 11 | 0.026 | 0.017 | — | — | 0.17 | 0.12 | ◎ | ○ | 13 | x |
| 12 | 0.026 | 0.035 | — | — | 0.04 | 0.03 | ◎ | ○ | 13 | x |
| 13 | 0.026 | — | 0.035 | — | 0.04 | 0.03 | ◎ | ○ | 10 | x |
| 14 | 0.026 | 0.016 | 0.016 | — | 0.04 | 0.03 | ◎ | ○ | 20 | x |
| 15 | 0.026 | — | — | 0.010 | 0.04 | 0.03 | x | ○ | 5 | x |
| 16 | 0.026 | 0.008 | — | — | 0.04 | 0.03 | △ | ○ | 39 | ○ |
| 17 | 0.017 | 0.028 | — | — | 0.04 | 0.03 | △ | ◎ | 33 | ○ |
| 18 | 0.035 | 0.017 | — | — | 0.04 | 0.03 | ◎ | x | 39 | ○ |
| 19 | JIS first class pure Ti | | | | 0.04 | 0.03 | x | ◎ | 38 | ○ |
| 20 | JIS second class pure Ti | | | | 0.09 | 0.06 | x | ◎ | 19 | x |
| 21 | JIS third class Ti | | | | 0.17 | 0.12 | x | ◎ | 12 | x |

Since the present invention has the above-mentioned characteristics, it is possible to provide a Ti alloy that is more inexpensive and exhibits better corrosion-resistance than the Ti-0.15Pd that is widely used at present, a Ti alloy having a cold-workability (press formability) that is not less than that of the Ti-0.15Pd, and a corrosion-resistance Ti alloy excellent in resistance against hydrogen absorption.

What is claimed is:

1. A corrosion-resistant Ti alloy consisting of
   Pd in an amount of 0.020–0.050 mass %,
   one or more platinum group elements other than Pd in an amount of one-third or more of the mass of Pd, and
   Ti.

2. The corrosion-resistant Ti alloy according to claim 1, wherein the platinum group elements other than Pd are Ir and/or Pt.

3. The corrosion-resistant Ti alloy according to claim 1, wherein the content of the platinum group elements other than Pd is 0.01–0.03 mass %.

4. The corrosion-resistant Ti alloy according to claim 1, wherein the Pd content is 0.020–0.030 mass %.

5. A corrosion-resistant Ti alloy consisting of
   Pd in an amount of 0.020–0.050 mass %,
   Ir and/or Pt in an amount of 0.01–0.03 mass %,
   Fe in an amount of 0.05 mass % or less,
   O in an amount of 0.05 mass % or less, and
   Ti.

6. A plate heat exchanger, comprising the corrosion-resistant Ti alloy of claim 5.

7. A component for an electrolysis bath, comprising the corrosion-resistant Ti alloy of claim 5.

8. A corrosion-resistant Ti alloy excellent in resistance against hydrogen absorption, consisting of
   Pd in an amount of 0.020–0.030 mass %,
   a platinum group element other than Pd in an amount of 0.01–0.03 mass %,
   Fe in an amount of 0.4 mass % or less,
   O in an amount of 0.4 mass % or less, and
   Ti.

9. A tube for a heat exchanger, comprising the corrosion-resistant Ti alloy of claim 8.

10. A tube for a laying pipe, comprising the corrosion-resistant Ti alloy of claim 8.

11. A method of making a corrosion-resistant Ti alloy, the method comprising
    forming a melt including Ti; and
    producing the Ti alloy of claim 1.

12. A method of making a corrosion-resistant Ti alloy, the method comprising
    forming a melt including Ti; and
    producing the Ti alloy of claim 5.

13. A method of making a corrosion-resistant Ti alloy, the method comprising
    forming a melt including Ti; and
    producing the Ti alloy of claim 8.

* * * * *